United States Patent
Amit et al.

(10) Patent No.: US 10,452,614 B2
(45) Date of Patent: Oct. 22, 2019

(54) STORAGE DATA REDUCTION ANALYSIS AND FORECAST

(71) Applicant: INTERNATIONAL BUSINESS MACHINES CORPORATION, Armonk, NY (US)

(72) Inventors: Jonathan Amit, Omer (IL); Nir Friedman, Eilat (IL); Danny Harnik, Tel Mond (IL); Chaim Koifman, Rishon Lezion (IL); Sergey Marenkov, Tel Aviv (IL); Lior Shlomov, Yehuda (IL); Dmitry Sotnikov, Givataim (IL); Shai Taharlev, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 413 days.

(21) Appl. No.: 14/738,538

(22) Filed: Jun. 12, 2015

(65) Prior Publication Data
US 2016/0364401 A1 Dec. 15, 2016

(51) Int. Cl.
*G06F 16/174* (2019.01)
*G06F 3/06* (2006.01)

(52) U.S. Cl.
CPC ........... *G06F 16/1744* (2019.01); *G06F 3/06* (2013.01)

(58) Field of Classification Search
CPC .................................................. G06F 17/30153
USPC ......................................................... 707/693
See application file for complete search history.

(56) References Cited

U.S. PATENT DOCUMENTS

| | | | |
|---|---|---|---|
| 5,894,588 A * | 4/1999 | Kawashima | H03M 7/48 360/8 |
| 7,103,608 B1 * | 9/2006 | Ozbutun et al. | 707/604 |
| 8,615,499 B2 * | 12/2013 | Chambliss et al. | 707/693 |
| 9,383,749 B2 * | 7/2016 | Prada Gomez | G05D 1/0061 |
| 9,385,749 B1 * | 7/2016 | Nam | H03M 7/6082 |
| 9,916,320 B2 * | 3/2018 | Harnik | G06F 17/30156 |
| 2003/0084238 A1 | 5/2003 | Okada et al. | |
| 2011/0145486 A1 | 6/2011 | Owa et al. | |
| 2014/0164686 A1 | 6/2014 | Choi et al. | |
| 2014/0281168 A1 | 9/2014 | Koseki | |
| 2014/0281344 A1 | 9/2014 | Shin et al. | |

(Continued)

FOREIGN PATENT DOCUMENTS

| JP | 408234921 | 9/1996 |
|---|---|---|
| JP | 2009117998 A | 5/2009 |

OTHER PUBLICATIONS

Dubois, Laura, "Real-time Compression Advances Storage Optimization", p. 7-8, Sponsored by IBM.

*Primary Examiner* — Jean B Fleurantin
(74) *Attorney, Agent, or Firm* — Griffiths & Seaton PLLC

(57) ABSTRACT

Methods, computing systems and computer program products implement embodiments of the present invention that include configuring a storage system to store multiple storage entities for access by one or more host computers in communication with the storage system, and specifying a compression condition including a minimum compression ratio. The storage system can then estimate an expected compression ratio for a given storage entity, compress the given storage entity upon the expected compression ratio meeting the compression condition, and provide, to a given host computer, access to the compressed given storage entity.

14 Claims, 3 Drawing Sheets

(56) References Cited

U.S. PATENT DOCUMENTS

2014/0379974 A1 12/2014 Yamamoto et al.
2016/0314141 A1* 10/2016 Harnik ............... G06F 16/1744

* cited by examiner

STORAGE DATA REDUCTION ANALYSIS AND FORECAST

FIELD OF THE INVENTION

The present invention relates generally to data compression, and specifically to implementing data compression estimation within a storage system.

BACKGROUND

Computer systems can use data compression to reduce the number of storage devices needed to store data, thereby reducing equipment and operational costs. Algorithms used to compress data include, but are not limited to, zlib, Graphics interchange Format (GIF), portable network graphics (PNG), lz4 and Roshal archive (rar). Compression algorithms data can provide a reduction of data footprints, and are typically dependent on the data that is to be compressed. For example, data which was previously compressed will not be reduced, whereas previously uncompressed text files can be reduced up to 90% of their original size.

SUMMARY

There is provided, in accordance with an embodiment of the present invention a method, including configuring a storage system to store multiple storage entities for access by one or more host computers in communication with the storage system, specifying a compression condition including a minimum compression ratio, estimating, by the storage system, an expected compression ratio for a given storage entity, compressing, by the storage system, the given storage entity upon the expected compression ratio meeting the compression condition, and providing, to a given host computer, access to the compressed given storage entity.

There is also provided, in accordance with an embodiment of the present invention a storage system, including one or more storage devices configured to store multiple storage entities for access by one or more host computers in communication with the storage system, and a processor configured to specify a compression condition including a minimum compression ratio, to estimate an expected compression ratio for a given storage entity, and to compress the given storage entity upon the expected compression ratio meeting the compression condition, and to provide, to a given host computer, access to the compressed given storage entity.

There is further provided, in accordance with an embodiment of the present invention a computer program product, the computer program product including a non-transitory computer readable storage medium having computer readable program code embodied therewith, the computer readable program code executing on a storage system and computer readable program code configured to arrange the storage system to store multiple storage entities for access by one or more host computers in communication with the storage system, computer readable program code configured to specify a compression condition including a minimum compression ratio, computer readable program code configured to estimate an expected compression ratio for a given storage entity, computer readable program code configured to compress the given storage entity upon the expected compression ratio meeting the compression condition, and computer readable program code configured to provide, to a given host computer, access to the compressed given storage entity.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
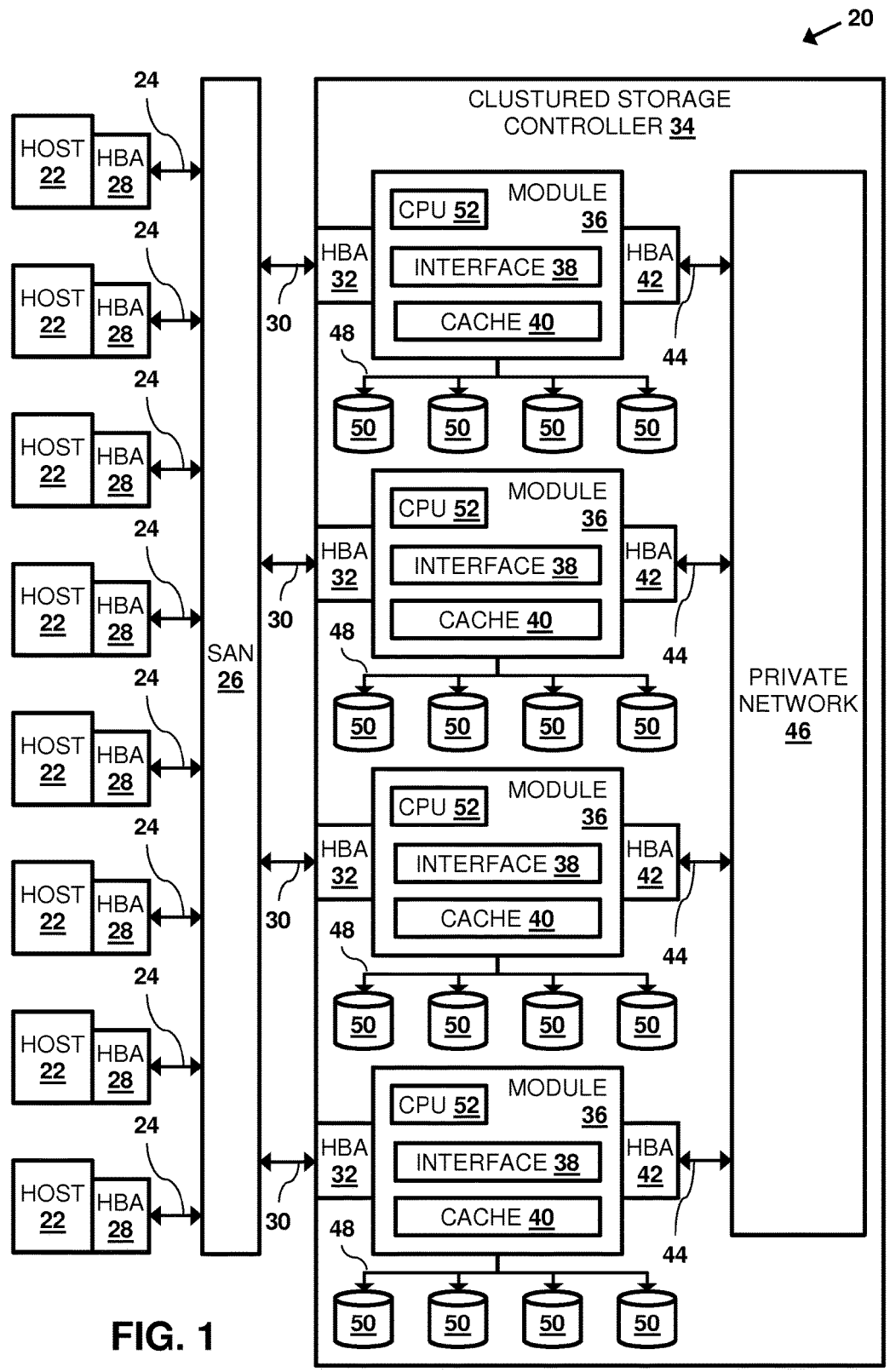
FIG. 1 is a block diagram that schematically illustrates a storage system comprising a storage controller comprising multiple modules having respective multiple storage devices, in accordance with an embodiment of the present invention.

Since data compression and decompression place demands on processor resources, there are typically tradeoffs between time and space when compressing data. Therefore, to efficiently utilize processor resources when managing storage entities (e.g., volumes and files), a compressibility of a given storage entity can first be estimated, and a decision on compressing the storage entity can then be made based on the estimated compressibility of the storage entity. Estimating compressibility can also be used to help to plan how much storage space will be required to store the storage entities.

Embodiments of the present invention provide methods and systems for implementing compression estimation within a storage system. By executing a compression estimation application on the storage system (i.e., as opposed to executing the application on a host computer), the compression estimation application has complete access to all storage entities stored on the system's storage devices. In some embodiments, upon completing the compression estimation, an estimated compression ratio can be presented to a user via a graphics user interface (GUI) or a textual user interface (TUI) or via a predefined application programming interface (API), and the user can select which of the storage entities are to be compressed. In an alternative embodiment, based on the respective estimated compression ratios of the storage entities the storage system can use an algorithm to decide which of the storage entities to compress.

In some embodiments, the storage system performing the compression estimation comprises a grid-oriented storage system. Grid-oriented storage (also known as grid storage) is a specialized approach for storing data that uses multiple self-contained interconnected storage nodes, so that any given storage node can communicate with any other storage node without the data having to pass through a centralized switch. In grid-oriented storage systems, each storage node comprises an interface node and a data node, wherein the interface node is configured to communicate with host computers and other storage nodes in the grid, and the data node is configured to manage data stored on the storage node. An example of a grid-oriented storage system is described in the description referencing FIG. 1 hereinbelow.

In embodiments of the present invention, a storage system can be configured to store multiple storage entities that comprise units of data that the storage system stores and manages for access by one or more host computers in communication with the storage system. Examples of storage systems include storage area networks (SANs) and network attached storage (NAS) systems, and examples of storage entities include, but are not limited to, chunks, blocks, files, volumes, objects, storage devices and logical unit numbers (LUNs).

A compression condition comprising a minimum compression ratio is specified, and upon estimating an expected compression ratio for each given storage entity, the given storage entity can be compressed by the storage system upon the expected compression ratio meeting the compression condition. Upon compressing the given storage entity, the storage system can provide, to a given host computer, access to the compressed given storage entity.

In some embodiments, the compression condition may be implemented as a process in the storage system. For example, the storage system may automatically (i.e., without user input) compress a given storage entity if the expected compression ratio for the given storage entity is at least 50%. In an alternative embodiment, the storage system can specify the compression condition by presenting, to a user, the estimated (i.e., expected) compression ratio for a given storage entity, and the given storage entity can meet the compression condition by receiving an input from the user that authorizes the compression of the given storage entity.

By implementing compression estimation within the storage system, embodiments of the present invention enable the storage system to manage system resources while compressing the storage entities. For example, when the storage system has a light load, the compression can be "throttled", thereby enabling the storage system to prioritize input/output (I/O) operations and to provide target levels of quality of service (QoS). Additionally, systems implementing embodiments of the current invention can estimate a compression ratio for any storage entity, since there are no permission access issues when performing the compression rations within the storage system.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
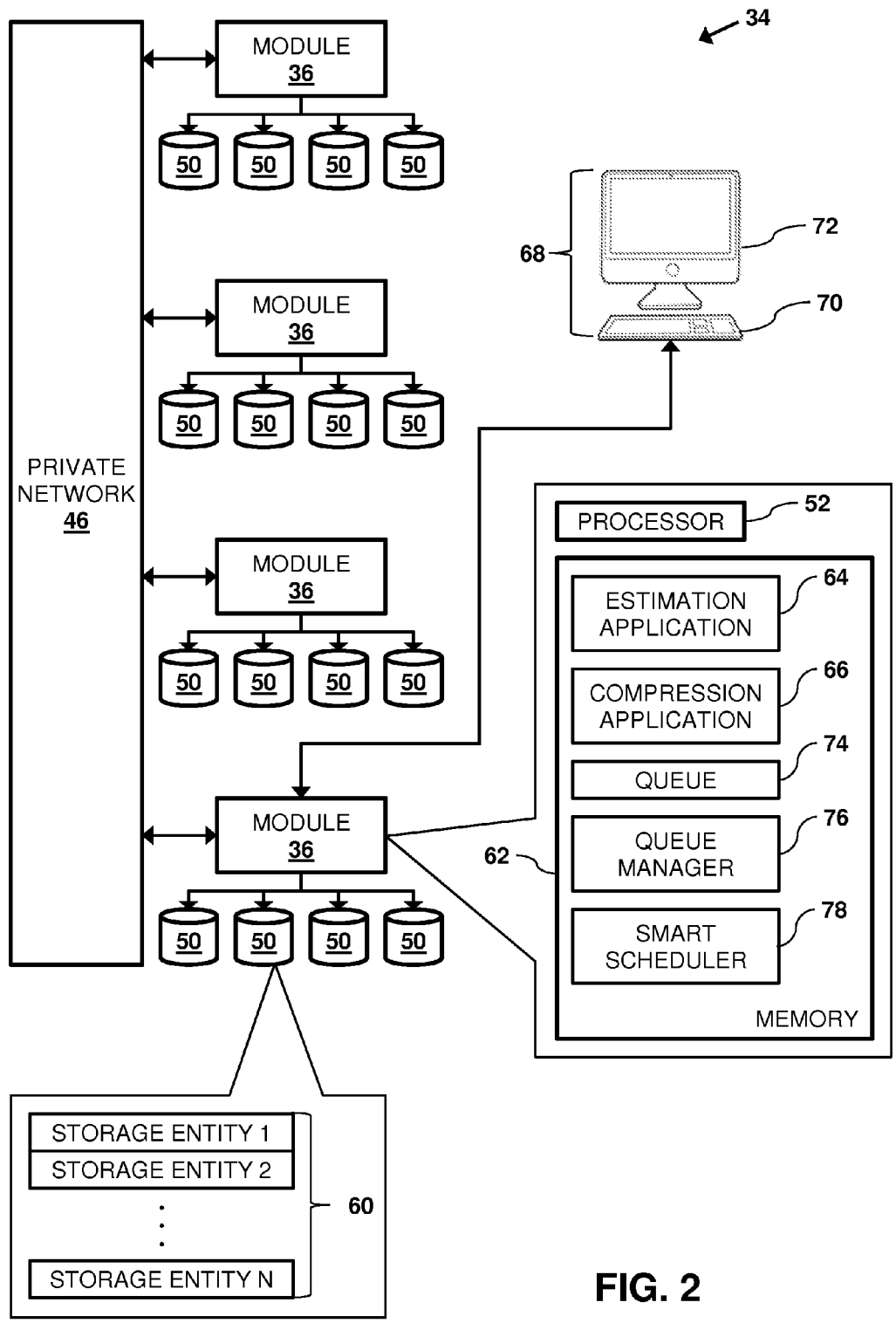
FIG. 2 is a block diagram that schematically illustrates a given module of the storage controller configured to estimate compressibility of storage entities, in accordance with an embodiment of the present invention.

FIG. 2 is a block diagram that schematically illustrates a given module 36 that is configured to estimate compressibility of storage entities 60 stored on storage devices 50, in accordance with an embodiment of the present invention. Each module 36 comprises processor 52 and a memory 62. In embodiments of the present invention processor 52 executes, from memory 62, a compression estimation application that is configured to estimate respective compression ratios for storage entities 60, and a compression application 66 that is configured to compress the storage entities.

In the configuration shown in FIG. 2 a console 68 comprising a keyboard 70 and a display 72 is coupled to a given module 36. In some embodiments, as described hereinbelow, upon estimating a compression ratio for a given storage entity, a given processor 52 can present, on display 72, a list of identities of the given storage entity and their respective estimated compression ratios. A system administrator (not shown) can view the list, and select, using keyboard 70 (or any other input device), one or more of the storage entities for compression.

In operation, compression estimation application 64 executing on a given processor 52 can estimate a compression ratio for any storage entity stored on storage controller 34 (i.e., on any storage device 50 in the storage controller). Likewise, compression application 66 executing on a given processor 52 can compress any storage entity stored on storage controller 34.

Compression estimation application 64 may comprise a standalone software application or library code that can be implemented within an operating system (not shown) executing on processor 52. An example of an algorithm that application 64 can use to estimate a compression ratio of a given storage entity 60 is described in U.S. Pat. No. 8,686, 881, whose disclosure is incorporated herein by reference. In operation, compression estimation application 64 can perform the following tasks:

Periodically estimate compression ratios for uncompressed storage entities 60 that are candidates for compression. In some embodiments, the candidates can be identified based on attributes of the storage entities. For example, a candidate for compression may comprise a given storage entity 60 that (a) has a size between 100 GB to 10 TB, (b) is not a snapshot, and (c) is not a mirror.

Toggle compression estimation on/off for a given storage entity 60 or for all the storage entities on storage controller 34.

Upon receiving a request (e.g., input from keyboard 70), estimate a compression ratio for a given storage entity 60.

In some embodiments, memory 62 can store a queue 74 that can be managed by compression estimation application 64. The queue comprises multiple entries (not shown) and can be configured to set priorities for user specific requests over periodic ones. For example, if a given storage entity 60 is in the queue at position 10 and in a pending or an idle state, the compression estimation application can promote the given storage entity to position 1 (i.e., in the pending state) upon receiving a request from a user (e.g., a system administrator).

To manage the queue, processor 52 can execute, from memory 62, a queue management application 76 that can assign each entry a state such as:

Idle: Compression estimation application 64 is not "doing anything" with a given storage entity 60 referenced by the entry.

Pending: A given storage entity 60 referenced by the entry is waiting for estimation.

Running: Compression estimation application 64 is currently estimating the compression ratio for a given storage entity 60 referenced by the entry.

When managing the queue, each given entry in the queue can store a last estimation try time and a last estimation success time, and also store the expected ratio for a given storage entity 60 referenced by the given entry. Additionally, compression estimation application 64 can continuously update the queue management application on any progress, and when the estimation is completed (with success or failure), the queue management application can convey result of the estimation, and promote another storage entity 60 in the queue.

In additional embodiments, processor 52 can execute, from memory 62, a smart scheduler 78 that can schedule compression estimation of storage entities 60 as follows:

Perform the compression estimations during off hours (i.e., during time periods with light processor loads).

Perform the compression estimation in "size order" of the storage entity (e.g., process the larger storage entities first).

Keep a quality of service (QoS) while performing the compression estimations. For example, the smart scheduler can automatically pause, resume and throttle compression estimation application 64 in order to minimize any performance impact.

Processor 52 comprises a general-purpose central processing unit (CPU) or special-purpose embedded processors (e.g., a complex programmable logic device or a baseboard management controller) which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Storage System Based Compression Estimation

Figure 3:
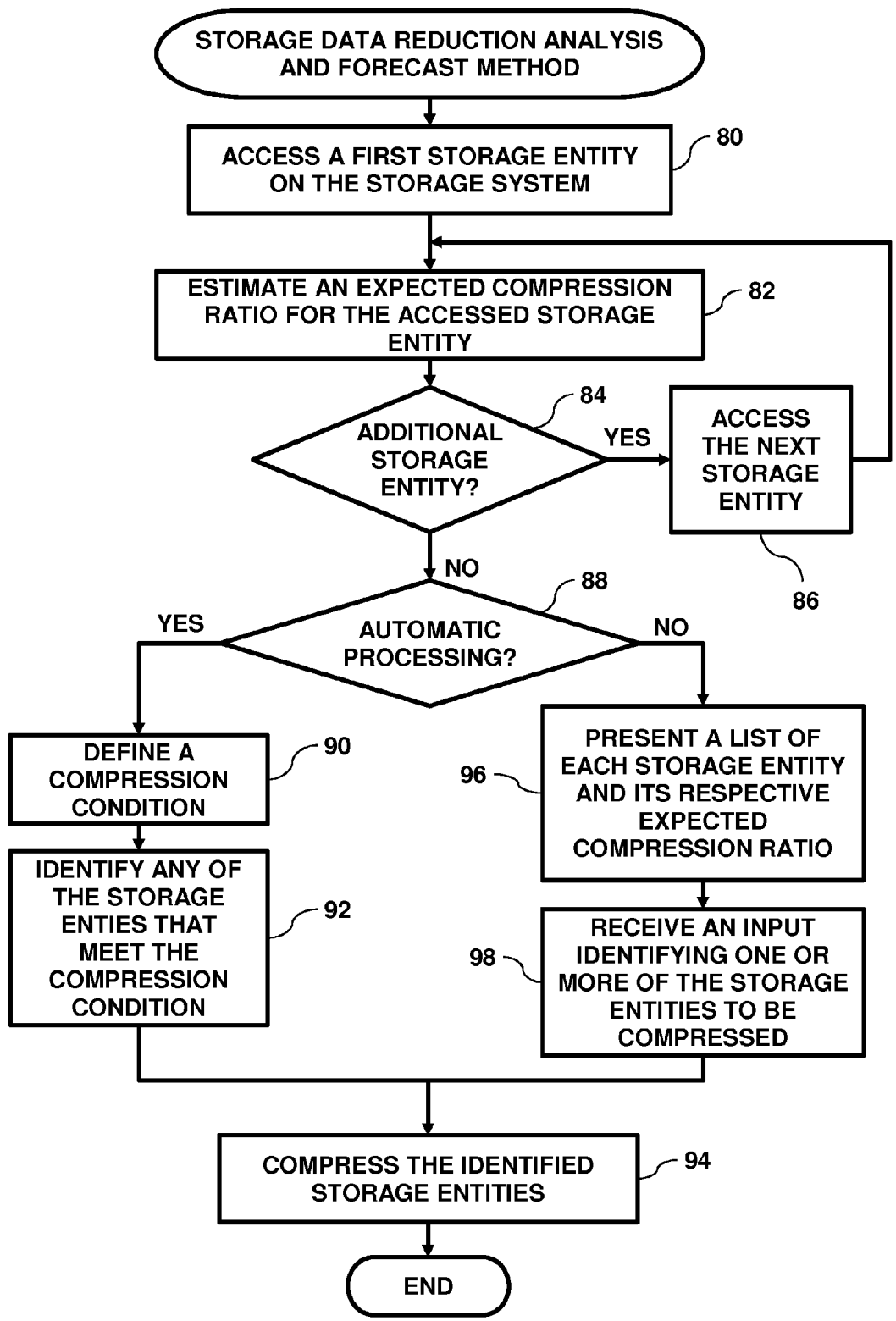
FIG. 3 is a flow diagram that schematically illustrates a method of forecasting data reduction in the storage controller, in accordance with an embodiment of the preset invention.

FIG. 3 is a flow diagram that schematically illustrates a method for a given module 36 to estimate compression ratios for storage entities 60 on storage controller 34, in accordance with an embodiment of the preset invention. Prior to performing the steps described in the flow diagram, storage controller 34 is configured to store, on storage devices 50, multiple storage entities 60 on storage devices 50 that can be accessed by one or more host computers 20 in communication with the storage system via SAN 26. In some embodiments, as described supra, a given storage entity 60 may comprise a given storage device 50.

While embodiments herein describe using a single compression condition when deciding whether or not to compress a given storage entity 60, using multiple compression conditions is considered to be within the spirit and scope of the present invention. Additionally or alternatively, configuring storage controller 34 may also include specifying a compression condition that comprises a minimum compression ratio. In some embodiments, the compression condition may also comprise one or more attributes for the storage entities. Examples of attributes include, but are not limited to size, type (e.g., image file, database file), creation date and last access date). For example, a first compression condition may comprise compressing a given storage entity 60 if the estimated expected compression ratio for the given storage entity is greater than or equal to 50%, and a second compression condition may comprise compressing a given storage entity 60 if the estimated expected compression ratio for the given storage entity is 25% and the given storage entity has not been accessed in the past three months.

In a first access step 80, a given processor 52 (executing compression estimation application 64) accesses a first storage entity on storage controller 34, and in an estimation step 82, the given processor estimates an expected compression ratio for the accessed storage entity. In a first decision step 84, if there are any additional storage entities 60 whose respective compression ratio has not been estimated, then in a second access step 86, the given processor access one of the additional storage entities, and the method continues with step 82.

Returning to step 84, if there are no additional storage entities 60 whose respective compression ratio has not been estimated, then in a second decision step 88, the given processor checks if automatic processing (i.e., compression authorization) is enabled. If automatic processing is enabled, then the given processor defines a compression condition in a definition step 90, identifies any of storage entities whose attributes (e.g., estimated compression ratio, size and type) match the compression condition in an identification step 92. Finally, in a compression step 94, the given processor executes compression application 66 to compress the identified storage entities, and the method ends. Upon compressing the identified storage entities, processor 52 provides, to one or more host computers 22, access to the compressed storage entities by mapping the compressed storage entities to the one or more host computers.

Returning to step 88, if automatic processing is not enabled, then in a presentation step 96, the given processor presents, on display 72, a respective identity and a respective expected compression ratio for each storage entity 60. In a receiving step 98, the given processor receives an input (e.g., from keyboard 70) indicating one or more storage entities 60 to be compressed, and the method continues with step 94.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring a storage system to store multiple storage entities for access by one or more host computers in communication with the storage system;
specifying a compression condition comprising a minimum compression ratio for a given storage entity; wherein specifying the compression condition comprises presenting the expected compression ratio to a user;
estimating, by the storage system, an expected compression ratio for the given storage entity;
compressing, by the storage system, the given storage entity upon the expected compression ratio meeting the compression condition such that storage system resources are only used to compress the given storage entity upon determining the minimum compression ratio will be achieved when performing the compressing; wherein meeting the compression condition comprises receiving, in response to presenting the expected compression ratio, an input from the user authorizing the compression of the given storage entity; and wherein the compressing is throttled according to the estimated compression ratio to prioritize input/output (I/O) operations dependent upon an I/O load of the storage system; and
providing, to a given host computer, access to the compressed given storage entity.

2. The method according to claim 1, wherein the storage system is selected from a group consisting of a storage area network system and a network attached storage system.

3. The method according to claim 1, and comprising repeating, for each of the storage entities, the steps of estimating the expected compression ratio, compressing the given storage entity, and providing access to the compressed storage entity.

4. The method according to claim 1, and comprising specifying one or more attributes wherein the compression condition comprises one or more storage entity attributes, and wherein the given storage entity is compressed upon the expected compression ratio meeting the compression condition and the given storage entity having the one or more storage entity attributes.

5. The method according to claim 1, wherein the storage entity type is selected from a group consisting of a logical unit, a storage device, a chunk, a block, a file, a volume and an object.

6. A storage system, comprising:
one or more storage devices configured to store multiple storage entities for access by one or more host computers in communication with the storage system; and
a processor configured:
to specify a compression condition comprising a minimum compression ratio for a given storage entity; wherein specifying the compression condition comprises presenting the expected compression ratio to a user, to estimate an expected compression ratio for the given storage entity, to compress the given storage entity upon the expected compression ratio meeting the compression condition such that storage system resources are only used to compress the given storage entity upon determining the minimum compression ratio will be achieved when performing the compressing; wherein meeting the compression condition comprises receiving, in response to presenting the expected compression ratio, an input from the user authorizing the compression of the given storage entity; and wherein the compressing is throttled according to the estimated compression ratio to prioritize input/output (I/O) operations dependent upon an I/O load of the storage system, and to provide, to a given host computer, access to the compressed given storage entity.

7. The storage system according to claim 6, wherein the processor is configured to repeat for each of the storage entities, the steps of estimating the expected compression ratio, compressing the given storage entity, and providing access to the compressed storage entity.

8. The storage system according to claim 6, wherein the processor is configured to specify one or more attributes wherein the compression condition comprises one or more storage entity attributes, and wherein the processor is configured to compress the given storage entity is upon the expected compression ratio meeting the compression condition and the given storage entity having the one or more storage entity attributes.

9. The storage system according to claim 6, wherein the storage entity type is selected from a group consisting of a logical unit, a storage device, a chunk, a block, a file, a volume and an object.

10. A computer program product, the computer program product comprising:

a non-transitory computer readable storage medium having computer readable program code embodied therewith, the computer readable program code executing on a storage system and comprising:

computer readable program code configured to arrange the storage system to store multiple storage entities for access by one or more host computers in communication with the storage system;

computer readable program code configured to specify a compression condition comprising a minimum compression ratio for a given storage entity; wherein specifying the compression condition comprises presenting the expected compression ratio to a user;

computer readable program code configured to estimate an expected compression ratio for the given storage entity;

computer readable program code configured to compress the given storage entity upon the expected compression ratio meeting the compression condition such that storage system resources are only used to compress the given storage entity upon determining the minimum compression ratio will be achieved when performing the compressing; wherein meeting the compression condition comprises receiving, in response to presenting the expected compression ratio, an input from the user authorizing the compression of the given storage entity; and wherein the compressing is throttled according to the estimated compression ratio to prioritize input/output (I/O) operations dependent upon an I/O load of the storage system; and computer readable program code configured to provide, to a given host computer, access to the compressed given storage entity.

11. The computer program product according to claim 10, wherein the storage system is selected from a group consisting of a storage area network system and a network attached storage system.

12. The computer program product according to claim 10, and comprising computer program product configured to repeat for each of the storage entities, the steps of estimating the expected compression ratio, compressing the given storage entity, and providing access to the compressed storage entity.

13. The computer program product according to claim 1, and comprising computer readable program code configured to specify one or more attributes wherein the compression condition comprises one or more storage entity attributes, and wherein the computer readable program code is configured to compress given storage entity upon the expected compression ratio meeting the compression condition and the given storage entity having the one or more storage entity attributes.

14. The computer program product according to claim 10, wherein the storage entity type is selected from a group consisting of a logical unit, a storage device, a chunk, a block, a file, a volume and an object.

* * * * *